US012641382B2

(12) United States Patent
Krieg

(10) Patent No.: US 12,641,382 B2
(45) Date of Patent: May 26, 2026

(54) METHOD FOR OPERATING A HEARING DEVICE AND HEARING DEVICE

(71) Applicant: Sivantos Pte. Ltd., Singapore (SG)

(72) Inventor: Julius Krieg, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 273 days.

(21) Appl. No.: 18/592,687

(22) Filed: Mar. 1, 2024

(65) Prior Publication Data

US 2024/0373177 A1 Nov. 7, 2024

(30) Foreign Application Priority Data

Mar. 1, 2023 (DE) ........................ 10 2023 201 871

(51) Int. Cl.
*H04R 25/00* (2006.01)

(52) U.S. Cl.
CPC .................................. *H04R 25/554* (2013.01)

(58) Field of Classification Search
CPC ................ H04R 25/554; H04R 25/453; H04R 2225/61; H04R 1/1041; H04R 25/50; H04R 2225/43
See application file for complete search history.

(56) References Cited

U.S. PATENT DOCUMENTS

| | | | | |
|---|---|---|---|---|
| 9,610,042 | B1 | 4/2017 | Vyshedskiy | |
| 10,062,373 | B2 | 8/2018 | Boesen | |
| 10,959,008 | B2 | 3/2021 | El Guindi et al. | |
| 11,417,307 | B2 | 8/2022 | Boesen | |
| 2010/0040239 | A1 | 2/2010 | Fretz | |
| 2015/0038850 | A1 | 2/2015 | Hatzillias et al. | |
| 2017/0347348 | A1* | 11/2017 | Masaki | H04W 72/20 |
| 2020/0314521 | A1* | 10/2020 | El Guindi | H04R 1/1041 |
| 2022/0095063 | A1 | 3/2022 | Aschoff et al. | |
| 2023/0074554 | A1 | 3/2023 | Sreepadarao et al. | |

FOREIGN PATENT DOCUMENTS

| | | | |
|---|---|---|---|
| AT | 513434 | B1 | 2/2015 |
| CN | 112656403 | A | 4/2021 |
| CN | 112806981 | B | 3/2022 |
| DE | 10145994 | C2 | 11/2003 |
| EP | 3972291 | A1 | 3/2022 |
| JP | 5495415 | B2 | 5/2014 |
| KR | 101160227 | B1 | 6/2012 |

* cited by examiner

*Primary Examiner* — Brian Ensey
(74) *Attorney, Agent, or Firm* — Laurence A. Greenberg; Werner H. Stemer; Ralph E. Locher

(57) ABSTRACT

A method operates a hearing device having a hearing aid and an electronic device coupled thereto for signal transmission. The hearing aid has tap detection for detecting a tapping movement of a hearing aid user on a hearing aid housing. The tap detection has a stored detection threshold, and contact with the hearing aid housing is detected as a tapping movement if the detection threshold is reached or exceeded. The electronic device has a number of different device functions which can be triggered by the tap detection. If an event of the electronic device occurs which does not directly result from an action of the hearing aid user: a notification of the event is sent from the electronic device to the hearing aid user and the detection threshold is reduced if a bodily movement of the hearing aid user is detected within a stored response time since the notification.

10 Claims, 3 Drawing Sheets

METHOD FOR OPERATING A HEARING DEVICE AND HEARING DEVICE

CROSS-REFERENCE TO RELATED APPLICATION

This application claims the priority, under 35 U.S.C. § 119, of German Patent Application DE 10 2023 201 871.3, filed Mar. 1, 2023; the prior application is herewith incorporated by reference in its entirety.

FIELD AND BACKGROUND OF THE INVENTION

The invention relates to a method for operating a hearing device, containing a hearing aid and an electronic device coupled thereto for signal transmission, wherein the hearing aid has tap detection for detecting a tapping movement of a hearing aid user on a hearing aid housing. The invention additionally relates to a hearing device for carrying out the method.

A hearing aid is generally referred to as an electronic device that supports the hearing capacity of a person wearing the hearing aid (hereinafter referred to as the "wearer" or "(hearing aid) user"). In particular, the invention relates to a hearing device which is configured to compensate for a hearing loss of a hearing impaired user in whole or in part. Such a hearing device is also called a "hearing aid". In addition, there are hearing aids that protect or improve the hearing capacity of normal hearing users, for example to enable improved speech comprehension in complex listening situations. Such devices are also referred to as "Personal Sound Amplification Products" (PSAP). Finally, in the sense used herein, the term "hearing device" also includes headphones worn on or in the ear (wired or wireless, and with or without active noise canceling), headsets, etc.

Hearing aids in general, and hearing aids in particular, are usually configured to be worn on the head and here in particular in or on a user's ear, in particular as behind-the-ear (BTE) or in-the-ear (ITE) devices. With regard to their internal structure, hearing aids typically have at least one output transducer, which converts an output audio signal supplied for output purposes into a signal perceptible to the user as sound, and outputs the latter to the user.

In most cases, the output transducer is configured as an electro-acoustic transducer, which converts the (electrical) output audio signal into airborne sound, which is delivered into the ear canal of the user. In a hearing aid worn behind the ear, the output transducer, also known as a "receiver", is usually integrated in a housing of the hearing aid outside the ear. In this case, the sound emitted by the output transducer is passed into the user's ear canal by means of a sound tube. Alternatively, the output transducer may also be arranged in the ear canal, and thus outside the housing worn behind the ear. Such hearing aids are also referred to as RIC devices after the term "receiver in channel". Hearing aids worn in the ear, which are so small that they do not extend externally beyond the ear canal, are also referred to as CIC devices (from the term "Completely in Canal").

In other designs, the output transducer can also be configured as an electro-mechanical transducer, which converts the output audio signal into structure-borne sound (vibrations), which is delivered, for example, into the skull of the user. There are also implantable hearing aids, in particular cochlear implants, and hearing aids the output transducers of which directly stimulate the user's auditory nerve.

In addition to the output transducer, a hearing device often has at least one (acousto-electric) input transducer. When the hearing device is in operation, the or each input transducer captures airborne sound from the environment of the hearing device and converts this airborne sound into an input audio signal (i.e., an electrical signal that carries information about the ambient sound). This input audio signal—also known as a "captured sound signal"—is regularly output to the user him/herself in original or processed form, e.g. to implement a so-called transparency mode in a headphone, for active noise cancellation or—e.g. in a hearing aid—to achieve an improved sound perception by the user.

In addition, a hearing device often has a signal processing unit (signal processor). The signal processing unit processes the or each input audio signal (i.e. modified in terms of sound information). The signal processing unit outputs a suitably processed audio signal (also referred to as "output audio signal" or "modified sound signal") to the output transducer and/or to an external device.

The term "hearing aid" or "hearing system" refers to a single device or group of devices and, where applicable, non-physical functional units that together provide functions to the user during operation. In the simplest case, the hearing device can consist of a single hearing aid. Alternatively, the hearing device can comprise two cooperating hearing aids for treating the two ears of the user. In this case, it is referred to as a "binaural hearing system" or "binaural hearing aid".

In addition or alternatively, the hearing device may comprise at least one further electronic peripheral device, for example a remote control unit, a charger or a programming device for the or each hearing aid. In modern hearing systems, a control program, in particular in the form of a so-called app (hereinafter referred to as "operating app"), is often provided instead of a remote control unit or a dedicated programming device, this control program being configured for implementation on an external computer, in particular a smartphone or tablet. Normally, the external computer is not itself part of the hearing aid, insofar as it is usually provided independently of the hearing aid and not even by the manufacturer of the hearing aid.

In order to simplify the operation of such a hearing device, it is sometimes provided that the user can control one or more functions of the hearing aid or an external functional unit (i.e. a peripheral device or an operating app) by interaction with the hearing aid. Typical examples of such functions are the acceptance and termination of a telephone call received on the external function unit.

U.S. Pat. No. 10,959,008 B2 among others, discloses a method for operating a hearing aid worn in or on the ear of a user and a hearing device having such a hearing aid, in which the user can trigger functions of the hearing aid or a smartphone connected to it, such as changing the volume of the output signal, switching between hearing programs of the hearing instrument or accepting and terminating phone calls, by means of a tap control, namely by a single or multiple finger tap on the hearing aid, the ear or the head. An acceleration sensor is used to detect the acceleration acting on the hearing aid. A tapping event is recognized when the detected acceleration meets certain stored criteria.

In practice, however, the use of such gesture or tap controllers often turns out to be error-prone. One reason for this is that many users find it difficult to get used to this control method, which is very uncommon in their daily lives; this particularly applies to older users, users with motor impairments and users who have little or no experience with input devices of modern electronic devices (computer mouse, touch screen, etc.). A second reason is that the intuitive tapping behavior of different users shows wide individual variation. A highly complex problem in the realization of a conventional tapping controller is therefore the differentiation of real tapping events, made intentionally by the user to trigger a function, from interfering events such as involuntary touches and other vibrations. Negative detection errors, in which a conscious tapping event is not detected by the tapping controller, and positive detection errors in which an interfering event is incorrectly recognized as a tapping event, are, however, unfavorably inter-related. The less specific the criteria for detecting a tapping event are designed, the more reliably genuine tapping events are detected, but the greater the probability of false positive errors. Conversely, the more specific the criteria for detecting a tapping event are designed, the more likely negative detection errors are to occur.

A technical problem with the tapping control for hearing aids is thus the reliable detection of a knocking or tapping gesture as well as the correct assignment of its meaning (e.g. whether the user wants to answer an incoming telephone call or is just scratching his/her head).

SUMMARY OF THE INVENTION

The object of the invention is to provide a particularly suitable method for operating a hearing device. In particular, it is intended to implement the most reliable tapping control which minimizes the probability of false-positive as well as false-negative results as far as possible. An additional object of the invention is to specify a particularly suitable hearing device.

With regard to the method, this object is achieved according to the invention by the features of the independent method claim and with regard to the hearing device, by the features of the independent hearing device claim. Advantageous embodiments and refinements form the subject matter of the dependent claims. The advantages and embodiments mentioned in relation to the method are also applicable mutatis mutandis to the hearing device and vice versa.

Where method steps are described in the following, advantageous embodiments for the hearing device are obtained in particular by the fact that the latter is configured to execute one or more of these method steps.

The invention relates to an operating method for a hearing device or hearing system that can be exposed to contexts that are not directly initiated by the user (e.g. incoming telephone call, reminder of a planned task).

The hearing device comprises at least one hearing aid and an electronic device, in particular a peripheral device, coupled thereto for signal transmission.

The hearing aid is, for example, a BTE hearing aid, which is worn behind an ear of the (hearing aid) user. The hearing aid has a (hearing) aid housing in which, for example, an input transducer, a signal processing unit, and an output transducer are accommodated. The hearing aid further contains tap detection, that is, a device for detecting or recording a tapping movement or tapping gesture of the user, which is in particular coupled to the signal processing unit. The tapping detection can also be embodied as part of the signal processing or as software, which processes suitable sensor signals and generates corresponding control signals.

The signal-transmission coupling between the hearing aid and the electronic device is preferably wireless. A wireless communication link, for example a radio link, in particular a Wifi, RFID, or Bluetooth link, is thus formed between the devices. For this purpose, the hearing aid and the electronic device have corresponding transceivers for data and signal exchange.

The electronic device is, for example, a mobile operating and display device, in particular a mobile computer device, preferably a smartphone or a tablet (computer). The electronic device has a number of different device functions, which can be triggered by the tap detection. This means that appropriate control commands for triggering or operating the device functions are transmitted via the transceivers or via the signal-transmission coupling when the tap detection detects a tapping movement. The device functions can be activated by means of a stored application software (operating software), with which the transferred control commands are implemented in software. The application software is preferably installed or can be installed on the electronic device for this purpose, as a so-called app or mobile app (mobile application, smartphone app).

The tap detection of the hearing aid has a stored detection threshold. A detection threshold here refers to a sensitivity, sensitivity threshold or response threshold (Function Activation Sensitivity), which allows a certain arbitrary limit to distinguish a tapping movement from other movements or touches of the hearing aid. The detection threshold is thus used in particular to distinguish an intended tapping movement of the user from other contacts of the device housing with a sufficient probability. The level of probability which is considered sufficient and the specific size of the probability is initially irrelevant. This can be determined, for example, from past wearing data or from appropriate tests or experiments. Different detection thresholds may sometimes be defined for different users, operating and environmental conditions, or application scenarios. Contact with the device housing is thus detected as a tapping movement if the detection threshold is reached or exceeded.

If an event of the electronic device occurs that does not directly result from an action of the hearing aid user (e.g. an incoming call, a device alarm/device alarm clock, a calendar notification, . . . ), according to the method a notification of the event is transmitted from the electronic device to the hearing aid user and the detection threshold is reduced, if a user's bodily movement is detected within a stored response time since the notification. As a result, a particularly suitable method for operating a hearing device is implemented.

The method according to the invention is thus carried out in particular as a user interface method for the hearing device.

When the event occurs on the electronic device, the current context of the event is determined (for example, an incoming telephone call). The determination or assignment of the event to a device function linked by the tap detection (e.g.: accepting the incoming phone call) corresponds to the definition of the context. The user is informed about the event or the context. The notification used for this purpose can be realized visually (e.g. display on a screen of the device) and/or acoustically (e.g. notification/ring tone) and/or haptically (e.g. vibration). The conjunction "and/or" here and in the following is to be understood to mean that features linked by means of this conjunction can be implemented both jointly and as alternatives to each other. According to the method, a first point in time for the notification to be sent is recorded.

According to the method, a second point in time at the beginning of a bodily movement of the user is also recorded. A bodily movement in this case is a movement of a body part of the user, in particular a movement of an arm or a hand in the direction of the hearing aid or the ear.

For example, from the recorded times described above it is determined whether the user raised his/her hand before or after notification about the device event (e.g., the incoming call). From this information it is inferred whether the intent of a tapping gesture is likely or unlikely. In the case of a likely tapping gesture, the detection threshold is set to a lower value than in the case of an unlikely tapping gesture. As a probability measure, the method uses, in particular, the time period between the first time point (notification) and the second time point (beginning of bodily movement), which is also referred to as the response time. This makes it easier to trigger or activate the device function (for example, answering an incoming phone call) by means of the tap detection. In particular, the probability of a false-negative tap detection, i.e. a wrongly undetected tapping movement, is reliably reduced.

Here and in the following an "electronic device event" or "context" means, in particular, any event or situation that meets the following conditions. Firstly, the event is not triggered directly or immediately by the user, which means that it feels for the user, for example, as if the prompt came from the hearing device. Secondly, the event requires a user interaction (response) or the user interaction is at least optional (e.g. an incoming call can be, but does not necessarily have to be, answered). Furthermore, there is preferably a sufficiently intuitive logical connection for the event between the type of context and the user interaction or user action (e.g. a tapping gesture means the acceptance of a call). The logical connection which is considered sufficient and the specific strength of the connection is initially irrelevant. This can be determined, for example, from past wearing data or from appropriate tests or experiments. Different connections may sometimes be defined for different users, operating and environmental conditions, or events. In addition, at least one feature of the context or the event should be appropriately transmitted to the user as a notification for the event. For example, the user can receive the notification via a loudspeaker of the hearing device (e.g. a speech-synthesized message "incoming call from", or a ring tone).

The following is a non-exhaustive list of examples of an event of the electronic device in the form of a current context and an associated device function that can be triggered by the tap detection: incoming phone call and acceptance of the phone call, an ongoing phone call and termination of the phone call, a scheduled reminder from a calendar app, which is confirmed and muted by a tap gesture, an offer of a health exercise (e.g., a breathing exercise) that initiates the proposed exercise, or a notification of a current physiological parameter and muting of the notification.

A tapping movement or tapping gesture (tap) is in particular a touch or at least an approach to the hearing aid housing with a user's hand, for example swiping over the surface of the device housing, a predefined hand gesture near the hearing aid, or a generic knocking gesture on the device housing with one finger, which can be a simple knocking/tapping or multiple taps. How the tapping movement is detected by the hearing aid or the tap detection is not essential to the invention. The person skilled in the art is familiar with different tap detections from the prior art. For example, the tapping movement can be detected by means of a movement or acceleration sensor integrated into the hearing aid, i.e. an IMU-based sensor (IMU: Inertial Measurement Unit), wherein the detection threshold is a movement or acceleration threshold. Alternatively, the tap detection can also be microphone-based. For this purpose, the hearing aid has at least one acousto-electric input transducer (microphone), wherein the recorded input signal is examined for knocking sounds (e.g. by means of a classifier), and wherein the detection threshold is, for example, a knocking sound level/volume. Another conceivable option, for example, is a capacitive touch key on the device housing, which capacitively detects the tapping movement and compares it with a corresponding threshold.

In addition, a measure of the probability of a registered tapping gesture can be derived from at least one feature of the tapping gesture. Examples of these tapping-gesture features include the strength of the tap, the time difference between the tap operations in the case of a multi-tap gesture, and the duration of the gesture. This probability can be taken into account in the course of the threshold comparison.

In a preferred embodiment, the detection threshold is reduced only temporarily, that is, for a specific period of time, if a bodily movement of the user is detected within the response time. This time period is also referred to in the following as the execution time. This ensures that the threshold for detecting a tapping movement is not reduced permanently, so that the likelihood of false positive results, in which an unwanted detection occurs, is avoided. According to this embodiment, the sensitivity of the tap detection is increased only for a certain time window.

The execution time starts at the second time point (beginning of bodily movement) and ends at a third time point. The third time point is given either by touching or tapping the device housing, or (if no touch is made) by a stored third time point.

At the first time point, the user receives a notification of the current context. This may be the time point of the beginning or the end of the notification, or any time in between. At the second time point, the beginning of a bodily movement of the user is registered (e.g. the user raises his/her arm). At the third time point, in particular the tap gesture is registered.

In a suitable dimensioning for the response time, i.e. the period of time between the notification and the beginning of the bodily movement, a time period between 100 ms (milliseconds) and 1,000 ms is used. This means that if the beginning of a bodily movement is detected in a time window of 100 ms to 1,000 ms after the notification, the detection threshold for the execution time is reduced.

A suitable value for the execution time is between 200 ms and 2,000 ms. In other words, the detection threshold is reduced 200 ms after the beginning of the bodily movement for a maximum of 1,800 ms. If no contact is made with the device housing or no tapping movement is detected by the tap detection for up to 2,000 ms after the beginning of the bodily movement, the detection threshold is reset or raised to the initial value. If a tapping movement is detected as the third point in time within the time window between 200 ms to 2,000 ms after the beginning of the bodily movement, the detection threshold can then be immediately raised back to the initial value.

This means that the default value for the sensitivity threshold of a function activation is preferably defined for a case in which the first time point is 100 ms to 1,000 ms before the second time, and the third time point is 200 ms to 2,000 ms after the second time.

Starting from these default values or this default scenario, a case differentiation can be performed so that for the user interface method according to the invention, multiple different detection thresholds can be set depending on the individual case. This minimizes the likelihood of false-positive and false-negative results. In a suitable refinement, three different detection thresholds are defined. In other words, a high, a medium, and a low detection threshold are defined. With a high detection threshold, the sensitivity of the tap detection is temporarily reduced, so that the probability of false-positive tap detections is reduced. Accordingly, with the low detection threshold the sensitivity is increased, in particular to reduce the probability of false-negative tap detections. The medium detection threshold corresponds to a default sensitivity. The threshold values or sensitivity levels are determined, for example, from past wearing data or from appropriate tests or experiments.

If a bodily movement of the hearing aid user is detected within the response time, the low detection threshold is set according to the method.

The medium detection threshold is suitably set, for example, if a bodily movement is detected in a time period prior to the response time and/or if contact with the hearing aid housing is detected prior to the execution time. In other words, the sensitivity threshold of the function activation is set to the medium value if the second time point falls earlier relative to the first time point than in the default scenario, and/or if the third time point falls earlier relative to the second time point than in the default scenario. In particular, since the medium sensitivity threshold is the default value, this means that in these cases the sensitivity threshold is not changed (increased/reduced).

The high detection threshold value is preferably set if a desired tapping movement or tapping trigger is unlikely. An example measure of this is the detection of a bodily movement before the notification is sent and/or if contact with the hearing aid housing occurs before the detection of a bodily movement. In other words, the sensitivity threshold of a function activation is set to the highest value if the second time point falls before the first time point and/or if the third time point falls before the second time point. As a result, a tapping gesture does not result in a function activation in response to a current context if a movement of the user's appendage started before the user received a notification of the context.

An additional or further aspect provides that an ideal response time and an ideal execution time can be defined and stored. For example, these ideal times can be determined individually by means of test measurements for each user. Alternatively, the ideal times are determined, for example, from statistical measurements. The closer the determined times (first, second, third time point) are to the ideal response time or ideal execution time, the lower the sensitivity threshold of a function activation is set, since the probability of a desired or intended tapping trigger is higher. In other words, a smooth transition between the different detection thresholds can be provided depending on the ideal time points or the deviations from them.

A bodily movement of the user is understood to mean in particular an arm or hand movement in the direction of the ear or the hearing aid. The person skilled in the art will be familiar with various methods for determining or detecting a beginning of such a movement. For example, the beginning of such a bodily movement can be determined using EEG measurements (electroencephalography), for example, by electrodes being arranged on the surface of the hearing aid housing to detect the intention, planning or execution of an arm movement based on corresponding characteristic currents. Equally conceivable is, for example, sound-based movement detection by means of the input transducers or microphones of the hearing aid, wherein sounds that originate from the joints or the clothing of the user indicate movements. Such acoustic movement detectors are known, for example, from CN 112656403 A, U.S. Pat. No. 10,062,373 B2, JP 5495415 B2, CN 112806981 B, U.S. Pat. No. 9,610,042 B1, AT 513434 B1, KR 101160227 B1, U.S. Pat. No. 11,417,307 B2, or US20150038850 A1. Alternatively, for example, an EMG-based movement detection via an electromyography sensor attached to the user's body is also possible. Furthermore, an IMU-based detection by a movement sensor (acceleration sensor, gyroscope) of the hearing aid, or an inertia measurement unit worn on or attached to the body or garment is also possible (for example, a wrist strap or IMU sensors that detect head rotation to the contralateral side to turn the correct side of the head towards an ipsilateral hand). In addition, optical or video-based motion detection methods are also conceivable, for example by means of a camera of the electronic device, or via an external camera.

In a preferred embodiment, the bodily movement of the user, in particular the beginning of the bodily movement, is detected with a feedback canceller of the hearing aid.

Feedback is understood here to mean an amplified sound of the hearing aid, which is recorded at the hearing aid microphone and fed back through the hearing aid. If the gain is large enough, the signal that passes through the feedback loop becomes louder and louder, resulting in the high-frequency whistle.

A feedback canceller is a unit of the hearing aid that reduces or minimizes this feedback effect. For example, an adaptive filter is used to model the feedback path. The output signal of the adaptive filter is subtracted from the microphone signal to cancel out the acoustic and mechanical feedback captured by the microphone, thus enabling more amplification in the hearing aid.

A hand that is moved toward the hearing aid acts as a sound reflection surface and changes the feedback path in the hearing aid or hearing aid housing when it is approached or touched.

The use of the feedback canceller to detect bodily movement enables particularly reliable detection of relevant bodily movements. In particular, essentially only bodily movements in the immediate vicinity of the hearing aid are therefore detected, thereby improving the accuracy of the method according to the invention. The feedback canceller can also be used mutatis mutandis as a touch sensor or tapping sensor to detect the tapping movement or tapping gesture.

The hearing device according to the invention comprises a hearing aid and an electronic device coupled thereto for signal transmission. The electronic device, configured for example as a smartphone, has a number of different device functions, which can be triggered by a tap detection of the hearing aid.

The hearing aid is used, in particular, for treating a hearing-impaired user (hearing aid user). The hearing aid is configured to capture sound signals from the environment and to output them to a user of the hearing aid. For this purpose, the hearing aid has at least one acousto-electric input transducer, in particular a microphone, as well as at least one electro-acoustic output transducer, for example a receiver. The input transducer captures sound signals (noises, tones, speech, etc.) from the environment during operation of the hearing aid and converts them into an electrical input signal (acoustic data). An electrical output signal is generated from the electrical input signal by modifying the input signal in a signal processor. The signal processor is part of the hearing aid, for example. The signal processing comprises, for example, an (output) amplifier for the (selective) amplification of the input signal or for adjusting a signal level of the output signal. The output transducer generates an acoustic sound signal from the output signal. The input transducer and the output transducer, as well as the signal processor if present, are housed in particular in a housing of the hearing aid. The housing is configured in such a way that it can be worn by the user on the head and near the ear, e.g. in the ear, on the ear, or behind the ear. The hearing aid is preferably configured as a BTE hearing aid, an ITO hearing aid, or an RIC hearing aid.

The hearing aid or the signal processor comprises the tap detection for detecting a tapping movement of a user on a hearing aid housing, and a movement sensor for detecting a bodily movement of the hearing aid user. The hearing aid further comprises a controller (i.e., a control unit) for carrying out the method described above.

The controller in this case is generally configured—in software and/or circuit technology—for carrying out the method according to the invention described above. The controller is thus specifically configured to record and/or monitor a first time point for the notification, a second time point for the beginning of a bodily movement, and, for example, a third time point for the detection of a tapping movement. The controller is also configured to change a detection threshold of the tap detection depending on the time points.

In a preferred embodiment, the controller, at least in essence, is formed by a microcontroller with a processor and a data store, in which the functionality for carrying out the method according to the invention is implemented in software in the form of operating software (firmware), so that the method—possibly in interaction with the user—is carried out automatically when the application software is executed in the microcontroller. As an alternative within the scope of the invention, the controller can also be formed by a non-programmable electronic component, such as an application-specific integrated circuit (ASIC) or an FPGA (Field Programmable Gate Array), in which the functionality for carrying out the method according to the invention is implemented in circuit technology.

In a preferred embodiment, the hearing aid movement sensor is implemented as a feedback canceller.

Other features which are considered as characteristic for the invention are set forth in the appended claims.

Although the invention is illustrated and described herein as embodied in a method for operating a hearing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Equivalent parts and dimensions are provided with identical reference signs in all figures.

Figure 1:
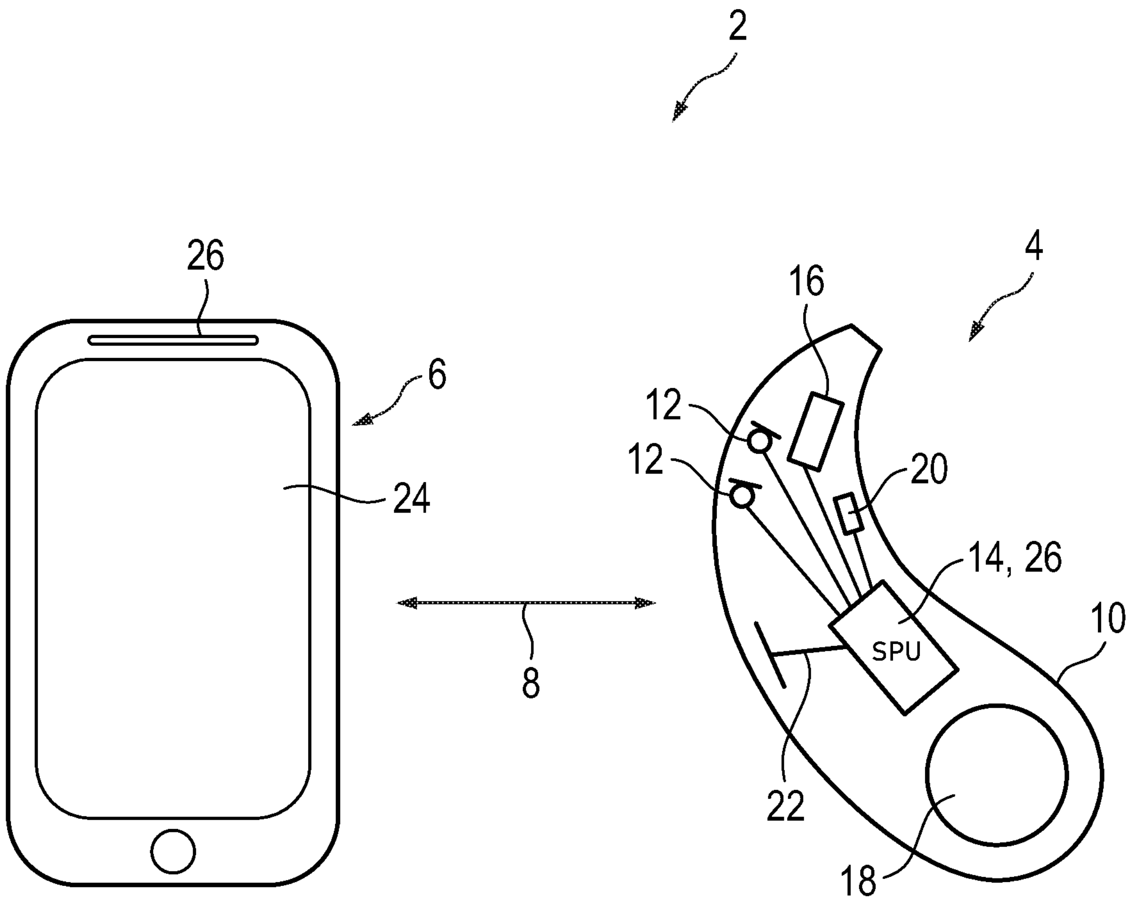
FIG. 1 is an illustration of a hearing device having a hearing aid and an electronic device.

Referring now to the figures of the drawings in detail and first, particularly to FIG. 1 thereof, there is shown a simplified and schematic representation of the basic structure of a hearing device 2.

The hearing device 2 is configured in particular as a hearing aid device in the form of a hearing system with a hearing aid 4 and with an external electronic (auxiliary) device 6 in the form of a display and operating device. The hearing aid 4 is configured by way of example as a behind-the-ear hearing aid (BTE). The hearing aid 4 and the device 6 are connected to each other for signal transmission via a wireless communication link 8. The communication link 8 is preferably configured as a radio link, for example as a Bluetooth or RFID connection.

As shown schematically in FIG. 1, the hearing aid 4 contains a (hearing) device housing 10 in which one or more microphones 12, also referred to as acousto-electric input transducers, are installed. Via the input transducers 12, the sound or the acoustic signals in the environment is/are captured and converted into an electrical audio signal.

The audio signal is processed by a signal processing unit 14, which is also arranged in the device housing 10. Using the audio signal, the signal processing unit 14 generates an output signal which is routed to a loudspeaker or receiver 16. The receiver 16 here is configured as an electro-acoustic (output) transducer, which converts the electrical output signal into an acoustic signal and outputs it. In the case of the BTE hearing aid 4, the acoustic signal is transmitted to the eardrum of a hearing aid device user, if applicable via a sound tube or external receiver, not shown in detail, which is connected to an earmold fitted in the ear canal. However, an electro-mechanical transducer is also conceivable as the receiver 16, as in a bone conduction receiver, for example.

The power supply of the hearing aid 4 and in particular of the signal processing unit 14 is provided by means of a battery 18 accommodated in the device housing 10.

The signal processing unit 14 is coupled for signal transmission to a movement sensor 20 of the heading aid 4. The movement sensor 20 is intended and configured in particular for detecting bodily movements of the (hearing aid) user. The movement sensor 20 is provided and configured to detect a body part 21, in particular a hand or a finger, approaching the hearing aid 4, and touching of the hearing aid 4 or the device housing 10.

The movement sensor 20 is configured, for example, as an accelerometer and/or a gyroscope, i.e. as a gyroscopic (position) sensor. The movement sensor 20 may alternatively also be a light sensor for detecting light signals in an environment of the hearing aid 16, or a pulse or blood pressure sensor for detecting pulse or blood pressure changes in the hearing device user 10. A movement sensor 20 which is a combination of an accelerometer and/or a gyroscope and/or pulse sensor and/or blood pressure sensor and/or light sensor is also possible. The movement sensor 20 is preferably configured as a feedback canceller, which in the course of the signal processing also suppresses or reduces acoustic feedback between the receiver 16 and the microphones 12.

The signal processing unit 14 is additionally routed to a transceiver 22 of the hearing aid 4 by signal transmission means. The transceiver 22 is used to send and receive wireless signals by means of the communication link 8. For example, the transceiver 22 can be configured as an induction coil.

In the embodiment of FIG. 1, a separate, mobile, electronic device 6 is coupled to the hearing aid 4 for signal transmission by means of the communication link 8. The device 6 shown schematically is, in particular, a smartphone. The smartphone 6 has a touch-sensitive display unit (screen, display) 24, which is also referred to hereafter as a touch screen. The smartphone 6 further contains at least one loudspeaker 26 for emitting acoustic signals.

The coupling for signal transmission between the smartphone 6 and the transceiver 22 of the hearing aid 4 is implemented via an appropriate integrated transceiver, not indicated in detail, for example a radio antenna, of the smartphone 6.

The smartphone 6 has an integrated controller which is essentially formed by a microcontroller with implemented application software. The application software is preferably a mobile app or a smartphone app, which is stored in a data store of the controller. During operation, the controller displays the application software on the touch screen 24, wherein the application software can be operated by a hearing device user using the touch-sensitive surface of the touch screen 24.

Figure 3:
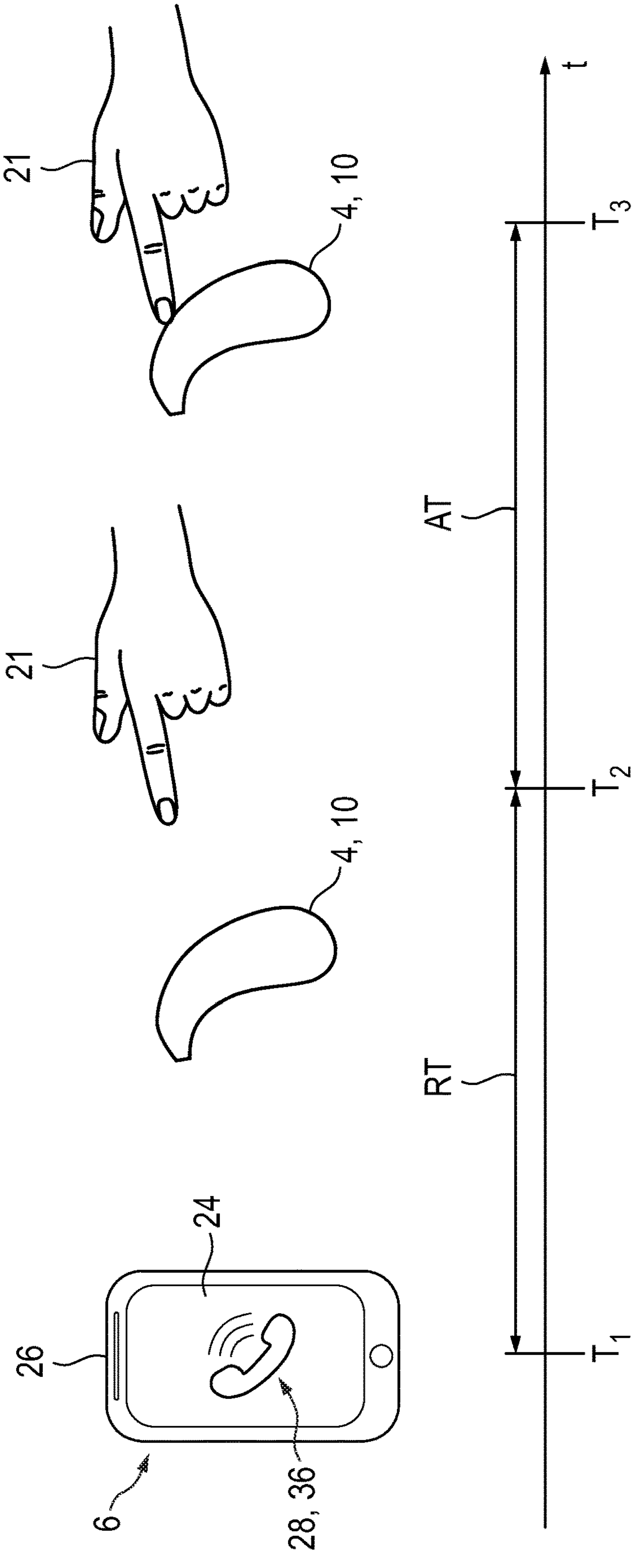
FIG. 3 is an illustration showing a method sequence in a sequence of drawings.

The device 6 or its application software has a plurality of integrated device functions, which can be triggered or activated by means of the communication link 8 by the tap detection 28 of the hearing aid 4 or the electronic device 6 (see FIG. 3).

The tap detection 28 in this embodiment, for example, is part of the signal processing unit 14, which processes the sensor signals of the movement sensor 20 with regard to a recognition or detection of a tapping movement or tapping gesture of the user and generates corresponding control signals, which are transmitted via the transceiver 22 and the communication link 8 to the smartphone 6 in order to trigger the desired device function.

The tap detection 28 has a stored detection threshold value. A sensor signal of the movement sensor 20 is detected as a tapping movement or tapping gesture if the detection threshold is reached or exceeded.

Figure 2:
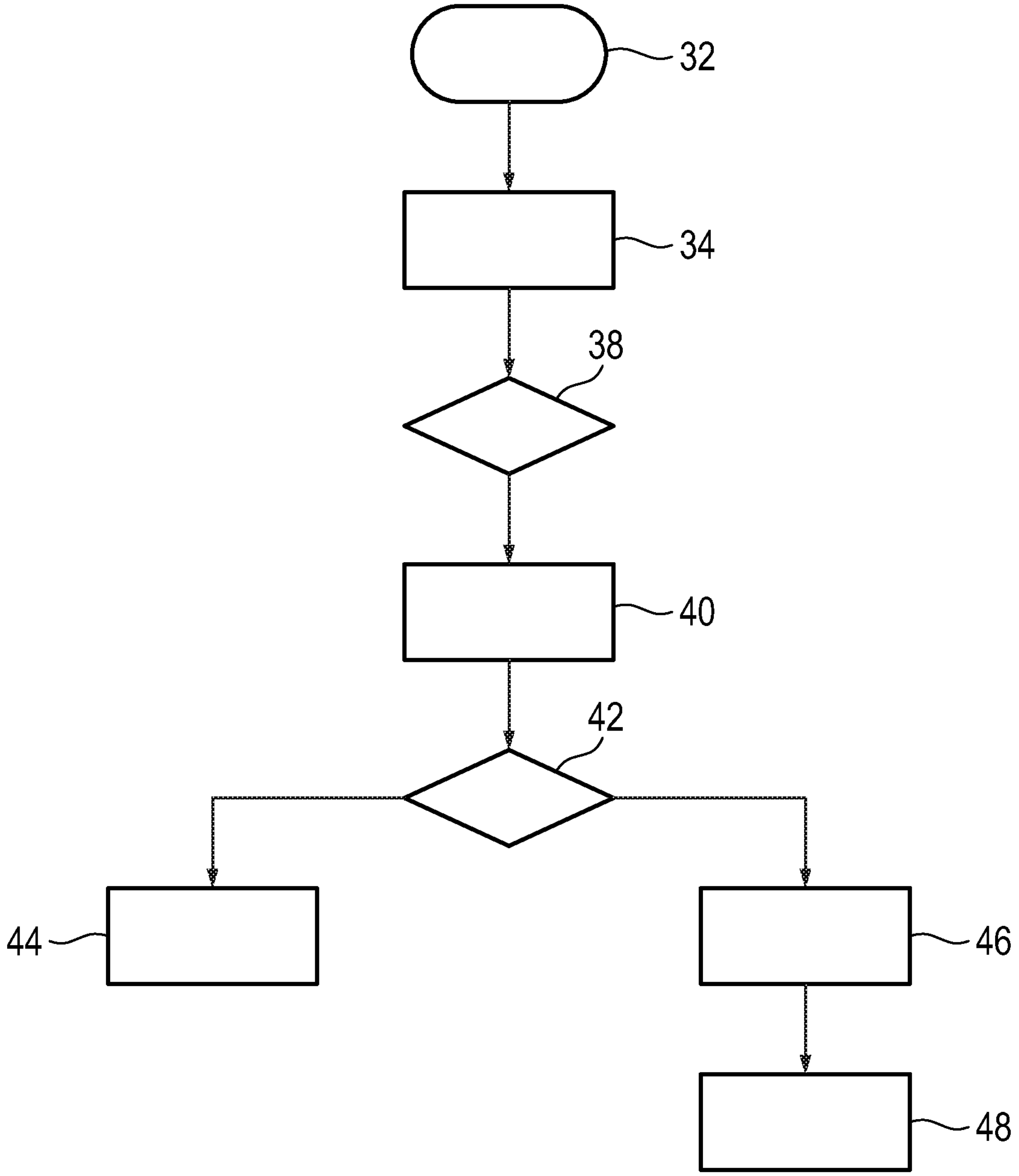
FIG. 2 is a flow diagram of a method according to the invention.

In the following, a user interface method according to the invention for the hearing device 2 will be explained in more detail with reference to FIGS. 2 and 3. FIG. 3 shows a diagram for an exemplary method sequence having three consecutive drawings. Time t is plotted along the horizontal direction.

If an event 30 of the electronic device 6 occurs which does not directly result from an action of the hearing aid user, the method is started in a method step 32. In the following, the event 30 is in particular an incoming telephone call.

In a method step 34, a notification 36 for the event 30 is first generated by the smartphone 6 or its app. The notification 36 is displayed, for example, as an icon on the touch screen 24 and/or output acoustically as a notification or ring tone via the loudspeaker 26 and/or haptically generated, for example by means of a vibration alarm. In the method step 34, it is additionally checked whether a device function that can be triggered by the tap detection 28 is linked to the event 30. In this example, the device function provided is specifically the answering of the telephone call.

The notification 36 is sent or transmitted at a first time point T1. This may be the time point of the beginning or the end of the notification 36, or any time point in between.

After method step 34, in a method step 38 it is monitored whether the beginning of a bodily movement of the user is detected within a response time RT. The beginning of a bodily movement, or the beginning of an approach of a body part 21 to the hearing aid 4, is characterized by a second time point T2. For example, the response time RT begins 100 ms after time point T1 and ends after 1,000 ms. In other words, in the method step 34 it is checked whether time point T2 falls within the response time RT.

If the comparison returns a positive result, in which the time falls within the response time RT, that is, if the beginning of a bodily movement is detected within the response time RT, the detection threshold of the tap detection is set to a reduced value for an execution time AT in a method step 40.

After method step 40, in a method step 42 it is monitored whether a tapping movement or tapping gesture is detected within the execution time AT. The detection or registration is characterized by a third time point T3. For example, the execution time AT begins 200 ms after time point T2 and ends after 2,000 ms. In other words, in method step 42 it is checked whether time point T3 falls within the execution time AT.

If the comparison returns a negative result, in which no tapping movement is detected by the tap detection 28 within the execution time AT, the detection threshold is reset or raised to the initial value in a method step 44.

If the comparison returns a positive result, in which the time point T3 falls within the execution time AT, the assigned device function (answer phone call) is triggered or activated in a method step 46. The detection threshold is then reset or raised to the initial value in a method step 48.

The method steps 32, 34 and 46 are carried out in particular by the smartphone 6 or the app, wherein the method steps 38, 40, 42, 44, and 48 are carried out in particular by a controller of the hearing aid 4, not specified in detail. The controller is, for example, part of the signal processing unit 14.

The claimed invention is not limited to the exemplary embodiments described above. Instead, other variants of the invention can also be derived from them by the person skilled in the art, without departing from the subject matter of the claimed invention. In particular, all individual features described in connection with the various exemplary embodiments within the disclosed claims can also be combined together in different ways without departing from the subject matter of the invention.

For example, it is conceivable to switch between multiple different detection thresholds depending on the situation by means of case differentiation in order to minimize the probability of false-positive or false-negative tap detections. For example, three different detection thresholds (low, medium, high) are defined.

If a bodily movement of the hearing aid user is detected within the response time RT, the low detection threshold is set according to the method.

The medium detection threshold is set, for example, if a bodily movement is detected at a time prior to the response time RT and/or if contact with the hearing aid housing is detected at a time prior to the execution time AT. In other words, the sensitivity threshold of the function activation is set to the medium value if the second time point T2 is detected earlier than 100 ms relative to the first time point T1, and/or if the third time point T3 is detected earlier than 200 ms relative to the second time point.

The high detection threshold is preferably set if a bodily movement is detected before the notification 36 is sent and/or if contact with the hearing aid housing 10 occurs before the detection of a bodily movement. In other words, the sensitivity threshold of a function activation is set to the highest value if the second time point T2 falls before the first time point T1 and/or if the third time point T3 falls before the second time point T2.

LIST OF REFERENCE SIGNS

2 hearing device
4 hearing aid
6 device/smartphone
8 communication link
10 hearing aid housing
12 microphone
14 signal processing unit
16 receiver
18 battery
20 movement sensor
21 body part
22 transceiver
24 display unit
26 loudspeaker
28 tap detection
30 event
32 method step
34 method step
36 notification
38 method step
40 method step
42 method step
44 method step
T time
T1, T2, T3 time
RT response time
AT execution time

The invention claimed is:

1. A method for operating a hearing device containing a hearing aid and an electronic device coupled thereto for signal transmission, the hearing aid having tap detection for detecting a tapping movement of a hearing aid user on a hearing aid housing, the tap detection having a stored detection threshold, and contact with the hearing aid housing is detected as the tapping movement if the stored detection threshold is reached or exceeded, wherein the electronic device has a plurality of different device functions, which are triggered by the tap detection, wherein, when an event of the electronic device occurs, which does not directly result from an action of the hearing aid user, performing the method having the following steps of:

a) transmitting a notification of the event from the electronic device to the hearing aid user; and b) reducing the detection threshold if a bodily movement of the hearing aid user is detected within a stored response time since the notification.

2. The method according to claim 1, which further comprises reducing the detection threshold for an execution time if the bodily movement of the hearing aid user is detected within the stored response time.

3. The method according to claim 2, which further comprises setting the stored response time as a time period between 100 ms to 1,000 ms.

4. The method according to claim 2, which further comprises setting the execution time as a time period between 200 ms to 2,000 ms.

5. The method according to claim 1, which further comprises storing a high detection threshold, a medium detection threshold, and a low detection threshold for the tap detection, wherein the low detection threshold is set if the bodily movement of the hearing aid user is detected within the response time.

6. The method according to claim 5, which further comprises setting the high detection threshold if the bodily movement is detected before the notification is sent and/or if contact with the hearing aid housing occurs before detection of the bodily movement.

7. The method according to claim 5, which further comprises setting the medium detection threshold if the bodily movement is detected in a time period prior to the response time and/or if contact with the hearing aid housing is detected before an execution time.

8. The method according to claim 1, which further comprises detecting the bodily movement with a feedback canceller of the hearing aid.

9. A hearing device, comprising:

an electronic device;

a hearing aid coupled to said electronic device for signal transmission, said hearing aid having a hearing aid housing, tap detection for detecting a tapping movement of a hearing aid user on said hearing aid housing, and a movement sensor for detecting a bodily movement of the hearing aid user;

said electronic device having a plurality of different device functions, being triggered by the tap detection; and a controller configured to carry out the method according to claim 1.

10. The hearing device according to claim 9, wherein said movement sensor is a feedback canceller.

* * * * *